Patented Mar. 5, 1929.

1,704,283

UNITED STATES PATENT OFFICE.

HANS T. CLARKE, OF NEW YORK, AND CARL J. MALM, OF ROCHESTER, NEW YORK, ASSIGNORS TO EASTMAN KODAK COMPANY, OF ROCHESTER, NEW YORK, A CORPORATION OF NEW YORK.

SOLUBLE HALOGEN SUBSTITUTED CELLULOSIC ORGANIC ACID ESTERS.

No Drawing. Application filed March 28, 1927, Serial No. 179,178. Renewed December 8, 1928.

This invention relates to halogen substituted cellulosic organic acid esters. One object of the invention is to provide halogen substituted esters which will be soluble in at least one commercial organic solvent, especially a substantially neutral or volatile one. Another object is to provide soluble esters containing such an amount of halogen directly and stably combined in the molecule as to improve the properties of the ester. Other objects will hereinafter appear.

So far as we are aware, previously published attempts to obtain cellulosic esters of organic acids which are both soluble in practical solvents and yet contain useful amounts of halogen, have not succeeded. (See, for example, Wiener Monatshefte f. Chemie 1905, vol. 26, pages 1459 to 1472.) In general, the substitution of a halogen in a fatty acid, whether acetic or any of the others, up to and including stearic, prevents esterification of cellulose by the halogen substituted acid under useful conditions.

In another prior research attempt was made to prepare hydro-cellulose esters of monochlor benzoic acid, but only the mono esters were obtained,—that is to say, there was only one atom of halogen for each six carbon atoms in the cellulosic group. Moreover, the product was not soluble in any of the useful organic solvents. (See Zeitschrift für Angewandte Chemie 1913, vol 26, page 137.)

We have found that halogen substituted organic acid esters of cellulose may be prepared in which the esterification is carried above the mono condition sufficiently to impart solubility in a usual solvent, such as chloroform. Furthermore, we obtain, along with this solubility, sufficient halogen in the ester molecule to modify the properties of the latter. In the preferred form of our invention, the halogen is approximately 14% to 18% of the weight of said ester. Moreover, the halogen is combined in the molecule so that it is stable,—that is, it is not easily split off. In fact, the halogen is so strongly combined in the molecule that it does not injure photographic light-sensitive emulsions when the latter are placed in contact with the adequately purified ester. The halogen is preferably directly bound to a carbon atom of the ring of a compound of the aromatic series.

The halogen is present in the molecules of our compounds in the groups derived from one or more of the following aromatic acids; mono di or tri, chlor or brom, benzoic, toluic, and homologous acids. The acyl groups of the esters may all be from such halogen substituted acids, or part of the acyl groups in the esters may be selected from said halogen substituted acids and the remainder of the esterification groups may be derived from other organic acids, preferably the lower fatty acids, such as acetic, propionic, and the isomeric butyric acids. In the halogen substituted aromatic acids, the halogen or halogens may be in the different positions in the nucleus such as ortho, meta, and para.

We shall now give examples of our invention by way of illustration, but it will be understood that our invention is not restricted to the details thus given, except as indicated in the appended claims.

We use preferably the broad esterification method disclosed in our copending application, Serial No. 179,177, filed March 28, 1927, for process of making cellulose esters of organic acids. An esterification bath is prepared by mixing thoroughly together 15 parts by weight of chlor acetic anhydrid, 10 parts of the orthochlor benzoic acid, 0.02 parts of magnesium perchlorate, and into this mixture there is stirred 2 parts by weight of cellulosic raw material. The latter may be of any of the forms of cellulose customarily employed in the manufacture of organic acid esters, such as cotton, preferably purified and bleached, cotton tissue paper, such as is used for nitration, and even wood pulp, preferably sulphite wood pulp which has been bleached. While the process will function on reverted cellulose from the viscose or cuprammonium processes or hydrocellulose prepared by the usual methods, we much prefer to employ cellulose in which the molecular degradation has been negligible and thus the product is better.

The reaction mixture hereinabove described is kept at about 60° to 65° C. until homogeneity is obtained. This ordinarily occurs in about 5 hours at the temperatures given above. Of course, slightly higher temperatures will shorten the time, but there is a danger of degrading the product at such elevated temperatures. The reaction mixture is then poured into a liquid in which the ester is insoluble, and the other ingredients are soluble. While water can be used for this purpose, we find it more convenient to pour the mass with stirring into methyl alcohol, whereby the ester separates in a granular form. It is substantially insoluble in acetone or benzol but dissolves readily in chloroform. From the latter it deposits transparent films or coatings, after spreading and evaporating the solution.

Along with any of the halogen substituted aromatic acids we may employ a lower fatty acid. For instance, along with the halogenated aromatic acid, we may employ one or more of the acids:—acetic, propionic, n-butyric, iso-butyric, n-valeric, n-heptylic, caprylic. In this way there can be obtained mixed esters. In general, the proportion of the lower fatty acid, relative to the halogenated aromatic acid, has to be increased as its molecular weight increases. For example, a larger proportion of valeric acid than of acetic acid is required. Since the acetic acid is the cheapest and most effective, we prefer to use it in connection with the halogen substituted acids.

As an illustration, a bath may be prepared by mixing 15 parts by weight of monochlor acetic anhydrid, 10 parts of ortho chlor benzoic acid, 2 parts of acetic acid and 0.02 magnesium perchlorate. Into this are stirred 2 parts of cleaned cotton and the reaction mass kept at 65° C. until it becomes homogeneous in appearance. This ordinarily occurs after about 7 hours at the above temperature. The aceto-orthochlorbenzoate of cellulose thus obtained is soluble in chloroform and insoluble in acetone. It may be separated from the reaction mixture in the usual way. When purified, a white granular precipitate is obtained. From chloroform solutions this yields transparent films or coatings.

By using only 1 part by weight acetic acid instead of 2 and employing .5 parts of magnesium perchlorate in the foregoing example we have obtained a mixed cellulose ester soluble in acetone. From its acetone solutions this cellulose aceto-orthochlorbenzoate yields transparent films by spreading and evaporating.

The soluble esters, which we have found, have more than one and up to three ester or acid groups for each six carbon atoms in the cellulose group.

In all of the halogen substituted esters of cellulose produced in accordance with our invention, the halogen is so strongly held directly to a carbon atom in the ring, that it does not tend to split off or attack or injure other bodies or substances with which the ester is normally mixed or in contact.

It will be obvious that all of these halogenated esters may be mixed with other cellulose esters, soluble in the same solvents, in plastic or film-forming compositions; and layers of them may be combined with layers of other cellulose esters in laminated films or other products, a common solvent being present to promote the union, in accordance with customary practice. For instance, the chloroform-soluble esters may be mixed with chloroform soluble cellulose acetates and the acetone-soluble ones with acetone-soluble cellulose acetate. Moreover, layers of our halogen substituted esters may be united to layers of chloroform-soluble or acetone-soluble cellulose acetate by the use of chloroform or acetone, or a cement containing one of the latter. Or a layer of one of these may be varnished or flowed over a layer of the other, so as to adhere to it. Plastifiers or softeners, such as those hitherto used with chloroform-soluble cellulose acetates, may be combined with our halogen substituted esters by means of chloroform with or without diluents or co-solvents like methyl, ethyl, and butyl alcohols. Tricresyl and triphenyl phosphates, paraethyltoluolsulphonamid are a few examples which can be amplified by reference to well known texts on cellulose acetate. The colloidized films and layers are transparent when deposited from chloroform or acetone solutions.

Having thus described our invention, what we claim as new and desire to secure by Letters Patent is:

1. A halogen substituted cellulosic organic acid ester which contains a proportion of from 1 to 3 acid groups for each six carbon atoms of the cellulosic group, sufficient to impart solubility in a substantially neutral volatile organic solvent, at least part of the acyl groups corresponding to a monocarboxylic acid containing a halogen substituted benzene ring.

2. A halogen substituted cellulosic organic acid ester which contains more than one acyl group for each six carbon atoms of the cellulosic group sufficient to impart solubility in at least one of the group of solvents, chloroform, acetone, and at least part of the acyl groups being selected from a halogen substituted aromatic acid in which the halogen is directly and stably attached to a carbon atom of the ring.

3. A halogen substituted cellulosic organic acid ester which contains a proportion of more than one acyl group for each six carbon atoms of the cellulosic group sufficient to impart solubility in at least one of the group of solvents, chloroform, acetone, and at least part of the acyl groups corresponding to a monocarboxylic acid containing a halogen substituted benzene ring.

4. A halogen substituted cellulosic organic acid which contains a proportion of more than one acyl group for each six carbon atoms of the cellulosic group sufficient to impart solubility in at least one of the group of solvents, chloroform, acetone, and at least part of the acid groups corresponding to orthochlor benzoic acid.

5. A halogen substituted cellulosic organic acid ester, at least part of its acyl groups being selected from the group of halogen substituted aromatic acids in which the halogen is attached directly to a carbon of the ring, and at least part of the acyl groups in said ester being selected from a fatty acid having less than nine carbon atoms.

6. A halogen substituted cellulosic organic acid ester, part of the groups of which are acetyl and part of which correspond to a monocarboxylic acid containing one halogen substituted benzene ring.

7. A halogen substituted cellulosic organic acid ester containing some of the acetyl group and some of the mono chlor benzoic group.

8. A cellulosic organic acid ester containing some of the acetyl group and some of the group corresponding to a mono halogen substituted aromatic acid in which the halogen is directly connected to a carbon ring.

9. A cellulosic organic acid ester containing at least two acyl groups for each six carbon atoms in the cellulose, at least part of the group corresponding to a monocarboxylic acid containing one halogen substituted benzene ring soluble in at least one of the group of solvents acetone, choloroform, and containing combined halogen in the acyl parts of the molecule.

Signed at Rochester, New York, this 23rd day of March, 1927.

HANS T. CLARKE.
CARL J. MALM.